United States Patent
Roth et al.

(10) Patent No.: US 10,860,548 B2
(45) Date of Patent: *Dec. 8, 2020

(54) GENERATING AND REUSING TRANSFORMATIONS FOR EVOLVING SCHEMA MAPPING

(71) Applicant: Tamr, Inc., Cambridge, MA (US)

(72) Inventors: Sharon Roth, Boston, MA (US); Ihab F. Ilyas, Waterloo (CA); Daniel Meir Bruckner, San Francisco, CA (US); Gideon Goldin, Cambridge, MA (US)

(73) Assignee: TAMR, INC., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,079

(22) Filed: Dec. 5, 2019

(65) Prior Publication Data
US 2020/0110731 A1    Apr. 9, 2020

Related U.S. Application Data

(63) Continuation of application No. 16/038,762, filed on Jul. 18, 2018.
(Continued)

(51) Int. Cl.
*G06F 7/00* (2006.01)
*G06F 16/21* (2019.01)
(Continued)

(52) U.S. Cl.
CPC .......... *G06F 16/211* (2019.01); *G06F 16/252* (2019.01); *G06F 16/254* (2019.01); *G06F 16/907* (2019.01); *G06F 16/9024* (2019.01)

(58) Field of Classification Search
CPC ...... G06F 16/258; G06F 16/252; G06F 16/25; G06F 16/211; G06F 16/254; G06F 16/907; G06F 16/9024
(Continued)

(56) References Cited

U.S. PATENT DOCUMENTS 6,874,141 B1    3/2005   Swamy et al.
7,921,072 B2    4/2011   Bohannon et al.
(Continued)

OTHER PUBLICATIONS

International Search Report and Written Opinion dated Nov. 21, 2019 in International Application No. PCT/IB2019/055114.
(Continued)

*Primary Examiner* — Md I Uddin
(74) *Attorney, Agent, or Firm* — Panitch Schwarze Belisario & Nadel LLP

(57) ABSTRACT

A system and method of use resolves the frustration of repeated manual work during schema mapping. The system utilizes a transformation graph—a collection of nodes (unified attributes) and edges (transformations) in which source attributes are mapped and transformed. The system further leverages existing mappings and transformations for the purpose of suggesting to a user the optimal paths (i.e., the lowest cost paths) for mapping new sources, which is particularly useful when new sources share similarity with previously mapped sources and require the same transformations. As such, the system also promotes an evolving schema by allowing users to select which unified attributes they want to include in a target schema at any time. The system addresses the technical challenge of finding optimal transformation paths and how to present these to the user for evaluation.

20 Claims, 17 Drawing Sheets

Related U.S. Application Data

(60) Provisional application No. 62/686,328, filed on Jun. 18, 2018.

(51) Int. Cl.
  *G06F 16/25* (2019.01)
  *G06F 16/907* (2019.01)
  *G06F 16/901* (2019.01)

(58) Field of Classification Search
  USPC .......................... 707/602, 752, 753, 999.007
  See application file for complete search history.

(56) References Cited

U.S. PATENT DOCUMENTS

| | | | |
|---|---|---|---|
| 8,099,382 B2 | 1/2012 | Liu et al. | |
| 8,180,810 B2 | 5/2012 | Chiticarlu et al. | |
| 8,234,312 B2 | 7/2012 | Thomas | |
| 8,924,415 B2 | 12/2014 | Thomas | |
| 9,201,558 B1 | 12/2015 | Dingman et al. | |
| 9,251,225 B2 | 2/2016 | Stanfill | |
| 9,686,348 B2 | 6/2017 | Talmor et al. | |
| 2003/0217069 A1* | 11/2003 | Fagin | G06F 16/258 |
| 2004/0212615 A1 | 10/2004 | Uthe | |
| 2005/0050089 A1 | 3/2005 | Minium et al. | |
| 2005/0160108 A1 | 7/2005 | Charlet et al. | |
| 2007/0055655 A1 | 3/2007 | Bernstein et al. | |
| 2008/0250357 A1 | 10/2008 | Lee et al. | |
| 2009/0024551 A1 | 1/2009 | Agrawal et al. | |
| 2010/0106752 A1 | 4/2010 | Eckardt, III et al. | |
| 2011/0131253 A1 | 6/2011 | Peukert et al. | |
| 2018/0075138 A1* | 3/2018 | Perram | G06F 21/6245 |

OTHER PUBLICATIONS

Rahm et al., "A Survey of approached to automatic schema matching," The VLDB Journal, vol. 10, pp. 334-350 (2001).

* cited by examiner

US 10,860,548 B2

GENERATING AND REUSING TRANSFORMATIONS FOR EVOLVING SCHEMA MAPPING

CROSS-REFERENCE TO RELATED APPLICATIONS

This utility application is a continuation of copending U.S. application Ser. No. 16/038,762 filed Jul. 18, 2018, which is incorporated by reference herein.

This utility patent application claims priority from U.S. provisional patent application Ser. No. 62/686,328, filed Jun. 18, 2018, titled "GENERATING AND REUSING TRANSFORMATIONS FOR EVOLVING SCHEMA MAPPING", and naming inventors Sharon Roth, Ihab F. Ilyas, Daniel Meir Bruckner, and Gideon Goldin.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2018, Tamr.

BACKGROUND

Field of Technology

This is This is related to data management, and more particularly to schema mapping tools as part of master data management (MDM) and extraction, transform, and load (ETL) suites.

MDM and ETL tools are used by businesses today to manage enterprise data. Business have data stored in multiple locations in multiple formats. These data sources may be continually updating as new records are entered into the system or existing records are updated. Analyzing the continually evolving data as a whole requires the integration of these sources. MDM and ETL tools assist this process, such that businesses can continue their analytics. Examples of MDM and ETL tools include Trifacta's Data Wrangler, IBM's Cleo, and Informatica's suite.

Background

To ease data management and analysis, organizations try to integrate different source datasets into a single target dataset. This process, often referred to as schema mapping, requires the understanding how to map different source attributes (e.g., firstName from Source1, FIRST_NAME from Source2, etc.) into single target attributes (e.g., First Name). Since source attributes may refer to the same kind of data, such as first names, using different formats (e.g., First_Name vs. Full_Name), schema mapping software typically allow users to transform these source attributes to match the format of a target attribute (e.g., extracting a first name from Full_Name).

Today's schema mapping software typically require users to specify transformations for each new source attribute to be mapped. Some programs implement validation rules, such as requiring that all values in a column are a string, and alerting the user or automatically modifying any records that violate the rule. While validation rules can aid in schema mapping, a fair degree of manual effort is still required even when mapping highly similar source attributes. Users are not provided with convenient functionality to take advantage of previous work, even if the transformations required are identical to those required by a previously mapped dataset.

Consider an example: a user maps a first source with two attributes, first name and last_name to a new target schema which contains FIRST_NAME and LAST_NAME. The user then needs to map a second source which has the single attribute, full_name. To do this, they introduce a transformation that splits full_name by the space character into its individual parts, and then maps these parts into FIRST_NAME and LAST_NAME, respectively. Now imagine the user receives a third source which again contains something of the format full_name. The problem here is that the user will have to repeat the transformation they just performed, again invoking a split transformation to map the new source into FIRST_NAME and LAST_NAME. This is problematic because the user must repeat unnecessary work, since the system could infer, automatically, that the third source requires the same treatment as the second.

Unfortunately, as the number of source datasets grows, the process becomes more challenging. In the biopharmaceutical industry, for example, organizations must sometimes map thousands of source datasets, each with hundreds of attributes. For any non-trivial project, it is untenable for a user to determine each individual mapping and each individual transformation needed to connect one source attribute to the target schema.

Description of Prior Art

"A survey of approaches to automatic schema matching" Rahm & Bernstein, The VLDB Journal 10: 335-350 (2001), discloses, in the Abstract, "Schema matching is a basic problem in many database application domains, such as data integration, E-business, data warehousing, and semantic query processing. In current implementations, schema matching is typically performed manually, which has significant limitations. On the other hand, previous research papers have proposed many techniques to achieve a partial automation of the match operation for specific application domains. We present a taxonomy that covers many of these existing approaches, and we describe the approaches in some detail. In particular, we distinguish between schema-level and instance-level, element-level and structure-level, and language-based and constraint-based matchers. Based on our classification we review some previous match implementations thereby indicating which part of the solution space they cover. We intend our taxonomy and review of past work to be useful when comparing different approaches to schema matching, when developing a new match algorithm, and when implementing a schema matching component." This surveys automated schema mappings, including reusing previous mappings, and identifies many aspects difficult to automate or needing further improvement.

U.S. Patents

U.S. Pat. No. 9,251,225 (issued Feb. 2, 2016, naming inventor Stanfill, titled "Mapping entities in data models") discloses, in the Abstract, "Mapping information that specifies attributes of destination entities in terms of attributes of source entities is received. At least some source entities correspond to respective sets of records in one or more data storage systems. The mapping information is processed to generate a procedural specification for computing values corresponding to attributes of destination entities. Collections of nodes are generated, each including a first node representing a first relational expression associated with a specified attribute. At least some collections form a directed acyclic graph that includes links to one or more other nodes representing respective relational expressions associated with at least one attribute of at least one source entity referenced by a relational expression of a node in the graph. At least two of the collections are merged with each other to form a third collection based on comparing relational expressions of nodes being merged."

U.S. Pat. No. 9,201,558 (issued Dec. 1, 2015, naming inventors Dingman et al., titled "Data transformation system, graphical mapping tool, and method for creating a schema map") discloses, in the Abstract, "Graphical mapping interface embodiments and method are provided for creating and displaying a schema map, which may be used by a data transformation system to perform a data transformation between at least one source schema and at least one target schema. According to one embodiment, the graphical mapping interface may comprise a source schema region for displaying a graphical representation of at least one source schema, a target schema region for displaying a graphical representation of at least one target schema, and a mapping region for displaying graphical representations of a plurality of links connecting the source nodes displayed in the source schema region to the target nodes displayed in the target schema region. The plurality of links may comprise at least one control link having at least one ECA rule associated therewith and at least one data link having at least one textual-based target field expression associated therewith."

None of the above provides a system which 1) uses existing schema mappings of data sources 2) to evaluate similarities and path cost factors and 3) suggest transformations when ingesting a new data source. What is needed, therefore, is a system that overcomes the above-mentioned limitations and that includes the features enumerated above.

BRIEF SUMMARY

A system and method of use resolves the frustration of repeated manual work during schema mapping. The system utilizes a transformation graph—a collection of nodes (which represent unified attributes—attributes for which source attributes have been mapped into) and edges (which represent transformations between nodes). The system further leverages existing mappings and transformations for the purpose of suggesting to a user the optimal paths (i.e., the lowest cost paths) for mapping new sources, which is particularly useful when new sources share similarity with previously mapped sources and require the same transformations. As such, the system also promotes an evolving schema by allowing users to select which unified attributes they want to include in a target schema at any time. The system addresses the technical challenge of finding optimal transformation paths and how to present these to the user for evaluation.

The system leverages previous mappings and transformations to improve schema mapping. The system provides suggestions to a user about where to map a source attribute. The system searches the transformation graph and identifies the most similar nodes, and asks the user which one they would like to map to. This saves the user time, since the user does not have to look through all of the unified attributes to find the best match. It also helps the user because the best matches are aggregated together. Thus, the user can pick the best match from the most likely matches. On their own, the user may have selected the first unified attribute that seemed like the best fit, rather than reading the whole list before selecting one.

The system leverages past user work by reusing existing transformation pathways. The user can map a source attribute to a unified attribute and utilize the defined transformations for that unified attribute. For example, if the user maps Attribute1 to a unified attribute called Name, any transformations leading out of Name will also be applied to Attribute1. The user does not have to redefine these transformations and repeat work.

The system suggests to a user a ranked list of unified attributes and the transformations required to map a given source attribute. These suggestions are based on the cost of applying previous transformations. For example, if the user wants to map a new source attribute First Name to Initials, it could take advantage of a pathway of existing transformations. In this example, there may already exist a transformation concatenating the unified attributes First Name and Last Name into Full Name, and a second transformation from Full Name that extracts the first letter of the names into the unified attribute Initials. The user could map First Name into this sequence of transformations and obtain the Initials without redoing work. As another example, if the user wants to map Attribute1 to Name, the system looks at all the paths leading into Name. The cost of adding a transformation from Attribute1 to the beginning of each of these paths is presented to the user. The user can then intelligently decide how to transform a source attribute based on this cost calculation. This provides guidance to the user when adding a transformation between a new source attribute and existing unified attributes.

The user is not tied to one target schema; rather, the user can export one or more views, or target schemas, at any point of the process. Thus, the user does not need to have a predefined schema ahead of time. Instead, the user can create new unified attributes and transformations as needed. The user can choose which unified attributes to include in the export. Any unified attributes can be included in exports, not just the unified attributes at the end of the paths. In this way, the target schemas can evolve as both unified attributes are added to the export options and different export combinations are used. Different users can export different target schemas, creating a fluid system.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION INCLUDING THE PREFERRED EMBODIMENT

Figure 1:
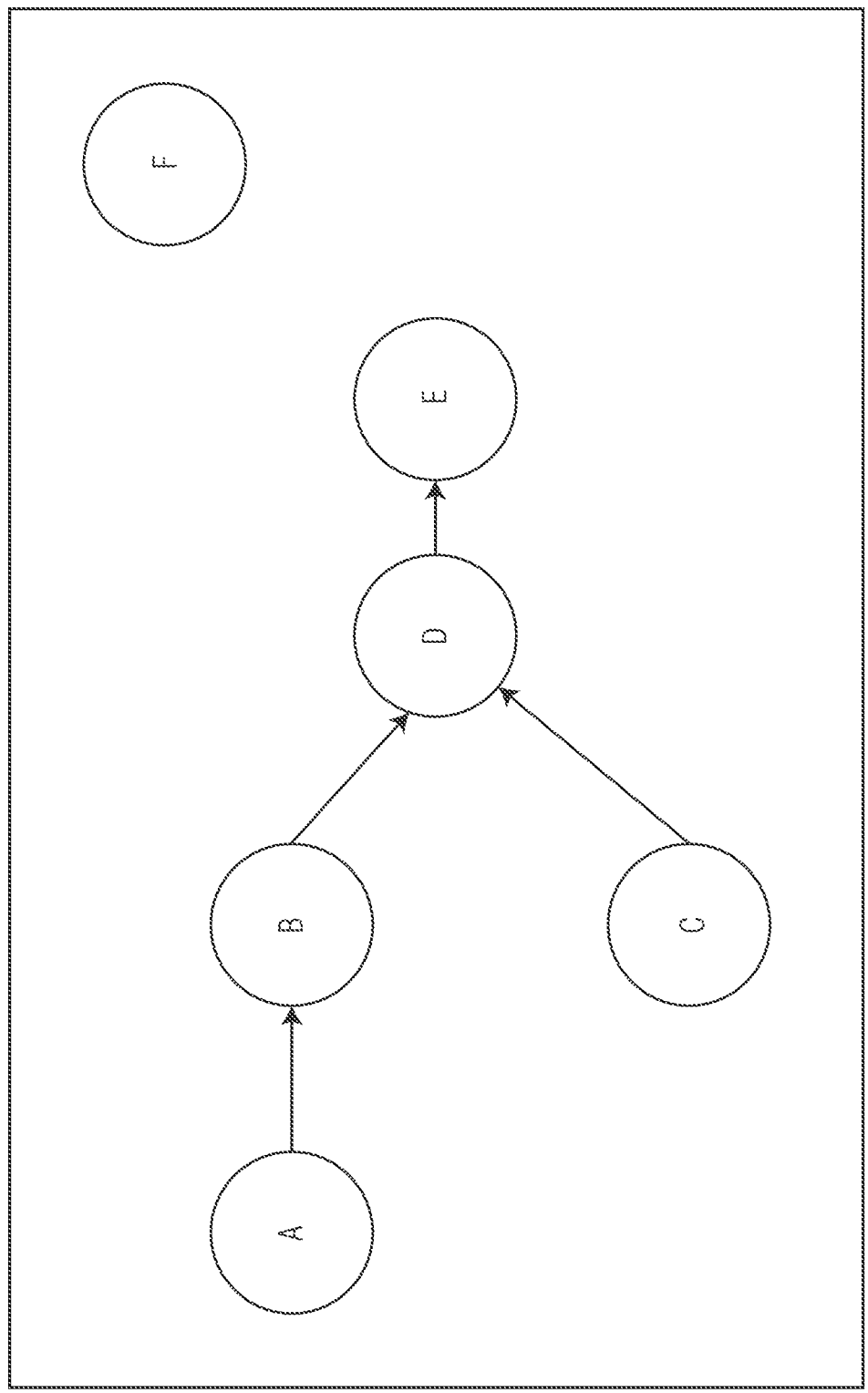
FIG. 1 illustrates a transformation graph with nodes and edges.

In the following detailed description, reference is made to the accompanying drawings which form a part hereof, and in which are shown, by way of illustration, specific embodiments which may be practiced. It is to be understood that other embodiments may be used, and structural changes may be made, without departing from the scope of the present disclosure.

Terminology

The terminology and definitions of the prior art are not necessarily consistent with the terminology and definitions of the current disclosure. Where there is a conflict, the following definitions apply.

Transformation graph: An evolving graph of unified attributes (i.e., nodes) and the transformations that connect them (i.e., edges). Target schemas can be specified at any time by selecting a subset of unified attributes. Source attributes are mapped to unified attributes that are in the graph.

Node: A node represents a unified attribute which may contain any number of records, including zero. Nodes have metadata such as a description of the node, data type (e.g. string), and source attributes mapped to it.

Unified Attribute: Represented as nodes in the transformation graph, it may contain any number of records, including zero.

Source Attribute: An attribute in a source dataset. It can be mapped to unified attributes in the transformation graph.

Target Schema: A set of target unified attributes that a user has chosen to export. The user can select any unified attributes to be in their target schema. Multiple target schemas may be applicable for one transformation graph.

Target Attribute: A unified attribute specified for including in a target schema.

Edge: An edge represents a transformation that can manipulate data between nodes, for example, an extract transformation or filling in empty values; these can change the values in a unified attribute. Mapping a source attribute to a node is not a transformation of this type, and is represented separately in the transformation graph as a mapping. An edge is between two nodes or unified attributes.

Transformation: Represented as edges in the transformation graph. Transformations can be written via a scripting language or selected from a pre-defined list in a graphical user interface (GUI).

Path: A path is a sequence of one or more connected nodes and edges.

Operation

The schema mapping system is preferably implemented within a data curation system, such as the system detailed in U.S. Pat. No. 9,542,412 (titled "Method and System for Large Scale Data Curation", issued Jan. 10, 2017, naming inventors Bates-Haus et al.) which is hereby fully incorporated by reference. The schema mapping system may be implemented as a software module within such a comprehensive data curation system, or as separate software operating on its own or within other systems.

A computing system operating the schema mapping system may be any single or multiple processor machine, or multiple network connected machines, with data input and output capabilities. Input can be direct, such as through disk, keyboard, or mouse, or indirect, such as over a network through an application programming interface (API) or webpage driven interface. Output may similarly be direct, such as display on a connected screen, or indirect such as written to disk or database for later or remotely connected access. A computing system may also be a virtual computing environment operating on top of physical hardware, such as within cloud platform computing.

At the core of the schema mapping system is a transformation graph—a collection of unified attributes, schema mappings, and transformations. This graph evolves as more sources and source attributes are added, removed, or edited. The transformation graph may be a represented within computer memory as an object with links to other objects representing the attributes, mappings, and transformations, and written to disk or database for permanent storage. The attribute, mapping, and transformation objects may similarly be represented within computer memory with data element members as discussed below, and written to disk or database for permanent storage.

Source attributes come from an input data source. In standard relational databases, source attributes are equivalent to columns in a data table. Source attributes are mapped to one or more nodes, or unified attributes, in the transformation graph. Nodes contain metadata including description, data type (e.g., string), sources mapped, etc. Each node in the transformation graph may have zero or more source attributes mapped to it. Mapping from a source attribute to a node makes the data of the source attribute available at that node in the same form as in the input data source. Users may create any number of nodes, starting as empty nodes. The user may then leave a node empty, populate it with one or more source attribute mappings, or populate it with transformations (i.e., setting the node as the output from another node through an edge in the graph). Users can, at any time, specify which nodes in the graph they want to include in a target schema (this is sometimes referred to as "schema-on-read" or an evolving schema), thereby establishing a schema mapping from the input data sources to the target schema.

An edge represents a transformation that can manipulate data between nodes, for example, an extract transformation or filling in empty values. Edges can change values of unified attributes between nodes. The edges are directed from one node into another node. Mapping a source attribute to a node is not a transformation in the sense that edges represent (as the mapping does not change the value from the source attribute), and as such mapping is represented separately in the graph.

Transformations May be Configured by Users

Referring to FIG. 1, a path is a series of nodes and edges that flow into these nodes. For example, node D in FIG. 1 has two paths leading to it: A→B→D and C→D.

Figure 2:
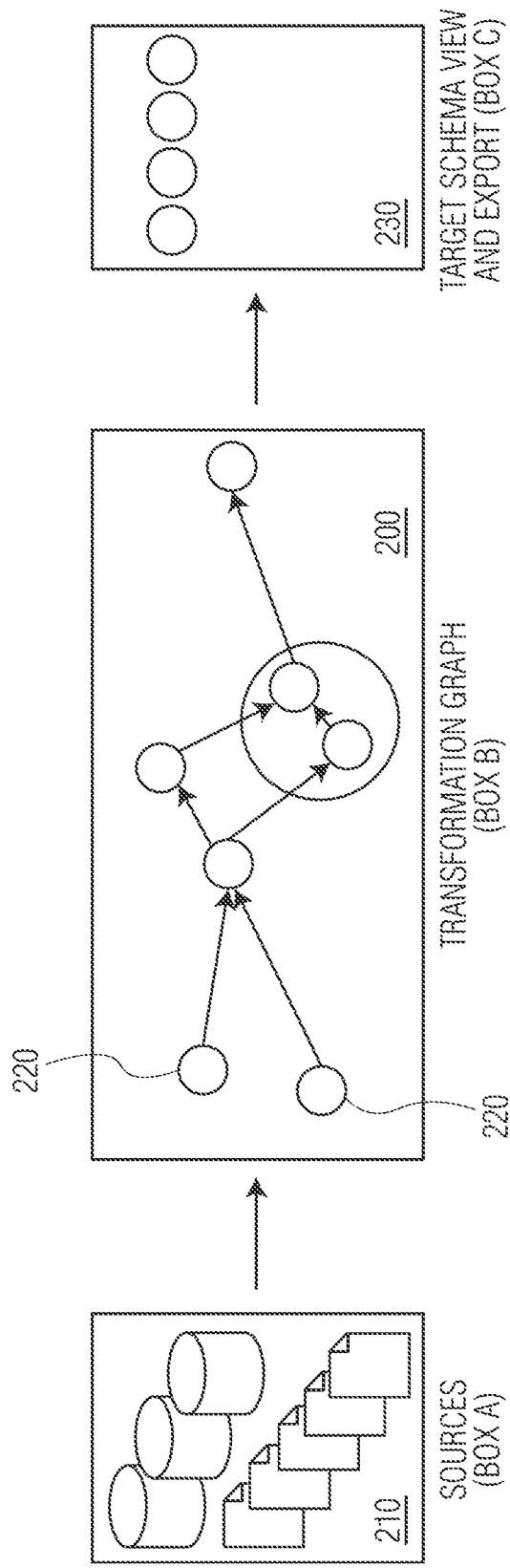
FIG. 2 illustrates the process from data sources, through a transformation graph, to a target schema.

Referring also to FIG. 2, transformation graph 200 depicts the flow of data via transformations. Users map source attributes from data sources 210 to nodes 220, existing or new, and edges connect the various nodes creating paths for the data to flow through. The user may choose to set up transformations between nodes so that the transformations apply to specific sources or source attributes, or so that all sources mapped to a node will also be included in the path.

Users may select any combination of nodes to specify target schema 230. This enables an evolving schema since the user adds and removes nodes as unified attributes are mapped and transformed over time, rather than having to predetermine which unified attributes are included in a target schema. Any number of target schema can be stored with a transformation graph. At any point, the user can edit an existing target schema or create a new target schema. Each target schema creates a schema mapping from the data sources to the target schema. A target schema may be exported to a file or database or server system. The target schema can then be queried via API, allowing access to the data through the target schema.

The transformation graph starts as an empty graph. Connection of a first data source may be fully manual through a user interface, such as creation of nodes and selection of source attributes to map into the created nodes, or automated such as generating nodes for all source attributes or a selected subset of source attributes. Once the initial nodes and edges are established, automated re-use becomes possible.

In an example schema mapping situation, a user maps a first source with two source attributes, first_name and last_name to nodes for FIRST_NAME and LAST_NAME, and creates a new target schema having those two nodes. The user then needs to map a second source which has the single source attribute, full_name. In the system, the user may first create a new node, such as FULL_NAME, and map the source attribute full_name to the new node (the user can later decide whether to include this node in any target schema or not). The user may then configure transformations, such as a split transformation to flow from FULL_NAME to FIRST_NAME, and a different split transformation to flow from FULL_NAME to LAST_NAME.

The user may then connect a third source which also contains something of the format full_name. Instead of repeating work, the system may identify a high similarity between the third source's full_name source attribute and the FULL_NAME node, and suggest that the user map full_name directly to FULL_NAME. If the user accepts the suggestion, or has the system auto-map to the highest similarity matches, the third source's full_name attribute is also mapped to the FULL_NAME node. At this point mapping and transformation work is complete, as the split transformation has already been specified, and thus any source data in FULL_NAME will automatically propagate to FIRST_NAME and LAST_NAME. This simple example shows the basis for how the system saves the user time and energy while simultaneously helping the user build a richer target schema.

The systems suggestions for paths are based on the cost of mapping a new source attribute into an existing path in the evolving transformation graph.

3.1 Description of Algorithms

At the core of the system is an algorithm that helps users save time and effort by mapping new source attributes in a way that allows users to take advantage of previous mappings and transformations. An example workflow is provided after overview of the algorithms.

Part 1

Given a new source, the system checks for each source attribute if a matching node already exists in the transformation graph—a match being a node that represents the same semantic meaning and has the same format as the source attribute. To do this, the system may compare data and metadata from the source attribute to the nodes already in the system There are a variety of existing similarity algorithms for determining these matches. Fundamentally, these algorithms work by comparing, for any given set of source and unified attributes, similarity between metadata, data, or both.

As an example of metadata comparison, the software system may determine the string similarity between source attribute and unified attribute names (e.g., first_name vs FIRSTNAME). This comparison may use metrics such as Levenshtein distance, or it may tokenize the strings into q-grams for set overlap calculation, such as Jaccard or Cosine similarity. Metadata comparisons such as attribute name but also source name and source owner name, size, etc. all return a similarity score between 0 and 1.

As an example of data comparison, the software system may determine the similarity between actual values of data within the source attribute and unified attribute (e.g., all values in first_name vs all values in FIRSTNAME). This algorithm may also use string similarity as a comparison metric, such as set overlap between bags of tokens. Because the data may be large, a locality-sensitive hashing algorithm such as min-hash (using, for example, MD5) may be used to sufficiently approximate similarity. For data wherein string comparisons does not yield meaningful results, like US social security numbers, the algorithm may instead compare the syntactic format of characters (e.g., ###-##-####).

Any number of metadata and data comparisons may be utilized for determining matches. In addition to the examples given above, rule-based similarity metrics may be applied at any time (e.g., if first_name and FIRSTNAME have the exact same value 90% of the time, consider the source and unified attributes a match). In a preferred embodiment multiple metrics are used, and each is treated as an individual signal in a classifier, such as logistic regression, a decision-tree, or a random forest of multiple decision trees. The classifier makes the final decision of match or not. In these techniques, there is no need to specify hard-coded thresholds as the system may learn them via training.

If there is a matching node, the source attribute is mapped to the matching node. Mapping a node attaches the source attribute's metadata (e.g., source, description, type, etc.) to it.

If there is not already a matching node, a new node is created and the source attribute is mapped to it.

Both matching source and unified attributes and creating new nodes (for unmatched source attributes) may be user configurable for a source. For example, a user may want to connect all source attributes from a source, and therefore select automapping for the entire source. Alternatively, the user may only want to include a subset of source attributes from a new source. In this case, the user may select a set of source attributes to automap (map to matching nodes or create new nodes if unmatched).

Part 2

In order to build reusable transformation paths, the system then prompts the user if they would like to connect (i.e., transform) the newly added nodes to any similar, existing nodes. For example, if adding a new node FIRST_NAME, the system may ask if the user wants to also connect this to the existing First_Initial node. The system makes these suggestions based on similarity metrics used in determining if the attributes were an exact match with an existing node, except using a final similarity score instead of an either/or match or no-match decision.

Calculating clusters of semantically related nodes can help with the search process here—the clusters most likely to contain matching unified attributes are first identified, and then pruned to find the unified attributes that are the most likely matches. The pruning process may be performed by topological sorting, top k, or similar methods.

If the user chooses to connect the new node to an existing node (e.g., FIRST_NAME to First_Initial), the algorithm (Primitive 1.3) generates candidate paths between the two for the user to select amongst; each of these paths are presented with a system-generated cost to help the user decide the best path. In the simplest case, this is a single new transformation between the two nodes. In other cases, it may involve connecting the new node to a node somewhere along a path to First_Initial. For example, it may suggest to add an edge to the node Name, which has an edge leading into First_Initial. In these cases, the system is taking advantage of existing transformations instead of forcing the user to always write a new and potentially unnecessary complex transformation.

Part 3

To help the user select the most appropriate path, the system computes a cost by calculating factors including processing time and memory usage. This cost only considers existing edges and assumes new edges are constant and necessary in any case—although in reality this assumption may vary based on factors such as the cognitive load of generating a new transformation. The costs are presented to the user alongside each path option, and a connection is made based on the user's selection.

The primitives referenced in the algorithms can be accessed through a Graphical User Interface (GUI) or Application Programming Interface (API).

3.2 Primitives

The algorithms for the primitives needed in the system include:

```
//Primitive 1.1 Adding a source S to the transformation graph G
addSource(S,G) {
    //source S has source attributes [ai, aj, ...]
    for each a in S {
        // If a is already represented in G then map it to the representing node.
        if G.containsExactMatch(a) {
            //map a to the appropriate node
            node = G.getExactMatch(a)
            node.map(a) //includes source info, timestamp, etc.
        } else {
            G.addAttribute(a)
        }
    }
}
//Primitive 1.2 Adding a source attribute a to transformation graph G
G.addAttribute(a) {
    newAttribute = addAttribute( ) // Create a new node. It is possible to call this at
        any time to add a node to the graph.
    new Attribute.map(a) //adds metadata to node
    // After adding a unified attribute, the user may wish to connect it to other
        unified attributes in the graph via transformations
    G.connectAttribute(newAttribute)
}
//Primitive 1.3 Connecting attributes
// For a specified unified attribute, find similar unified attributes and ask the user if
    they would like to add a transformation between the unified attribute and its
    similar unified attributes.
// G is the transformation graph
connectAttribute(attribute,G) {
    [candidateMatches] = findMatches(attribute, G)
    //Ask which similar nodes the user wants to connect to
    if [candidatematches].isEmpty {
        // notify user that no candidate matches were found
        // user may choose to manually connect the unified attribute to other
            unified attributes at any time
    } else {
        [matches] = askUserForMatches(attribute, [candidateMatches])
        // For each match, a path selection is needed connecting the two
            nodes. For each match, iterate through all the paths
            leading to the match and estimate the cost of each path.
        for each m in [matches] {
            // Finds all the paths leading into m
            [paths]=getPaths(m)
        }
        // Calculate the cost of each path
        for each p in [paths] {
            p.cost = getCost(p){
                // assign a fixed cost (NEW_EDGE_COST) to the
                    new transformation, and then add costs for
                    each existing transformation t in path p
                cost = NEW_EDGE_COST;
                for each t in p {
```

```
            cost += t.cost
        }
        return cost
    }
}
[userPaths]=[ ]
// Next, ask the user which path to accept based on the costs
for each p in [paths] {
    // shows the cost of the path to the user, and asks the user if
        wants to accept the path. Accepted paths are added to
        [userPaths]
    [userPaths] = askPath(p.cost)
}
for each [userPaths] {
    // add a user defined transformation between new node and the
        first existing node in the selected path.
    G.addTransformation(userPaths.first)
        // Optionally, return/exit (i.e., once 1 edge is added)
    }
}
}
//Primitive 1.4 Removing a source and its mappings
removeSource(S,G) {
    // source S has source attributes [ai, aj, ...] mapped to nodes in the graph G
    for each a in S {
        // find the unified attribute a was mapped to
        attribute=findAttribute(a)
        // removes the mapping from the unified attribute in the graph
        G.attribute.removeMapping(a)
    }
}
//Primitive 1.5 Removing an attribute
// Deletes the unified attribute (node) from the graph, thereby removing all
    associated mappings and transformations.
removeAttribute(A,G) {
    G.attribute.deleteAttribute(A)
}
//Primitive 1.6 Removing a transformation
removeTransformation(t) {
    // deletes the transformation between two unified attributes
    G.deleteTransformation(t)
}
//Primitive 1.7 Removing a transformation
removeAttributeTransformation(a1,a2) {
    // find the transformation between nodes a1 and a2
    t = findTransformation(a1,a2)
    // deletes the transformation
    G.deleteTransformation(t)
}
```

3.3 Example Use Case

The following discussion explores this system with an example.

Step 1

Figure 3:
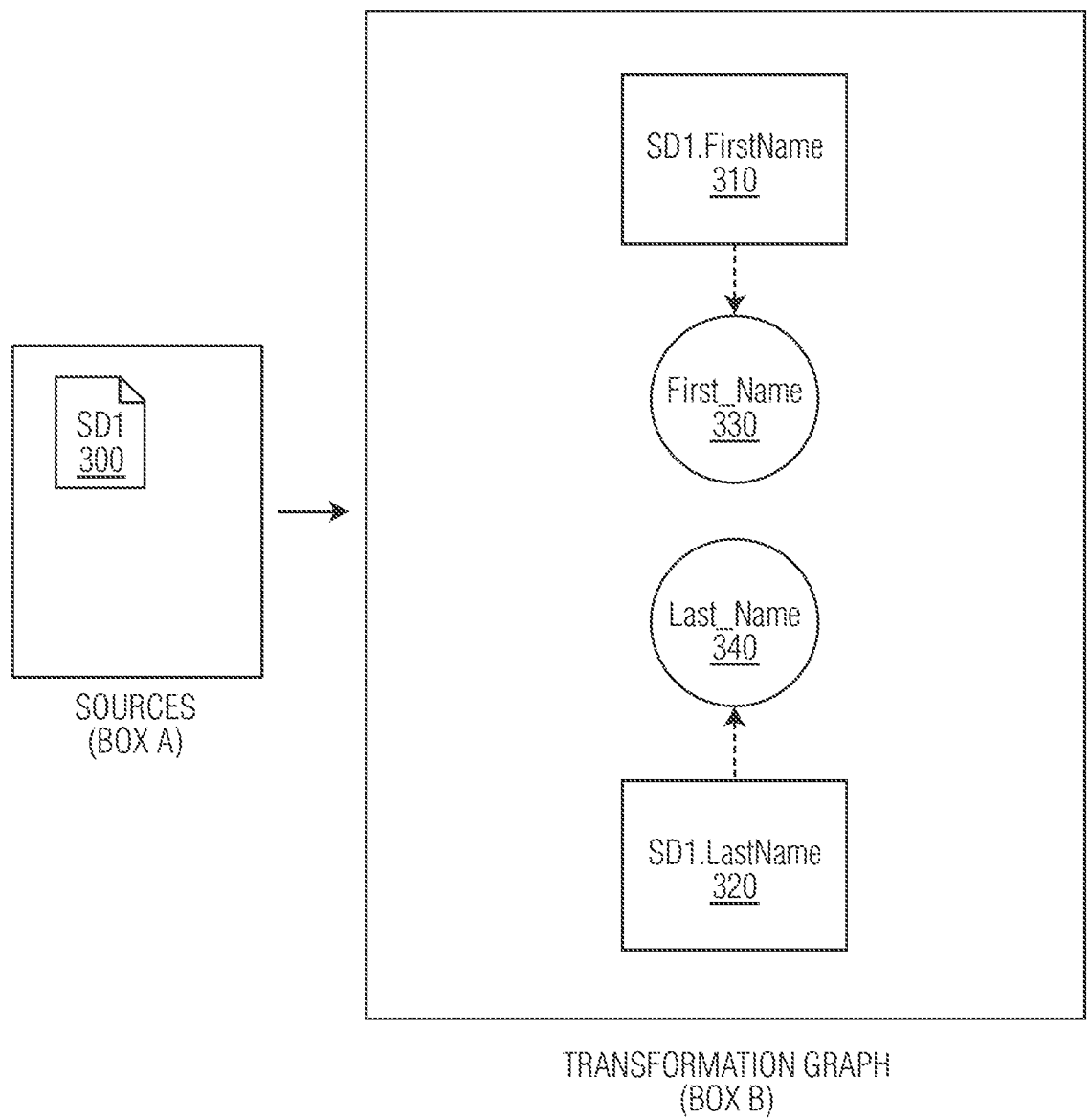
FIG. 3 illustrates associating source attributes from a data source to nodes in a transformation graph.

Referring also to FIG. 3, a new source dataset 300 (SD1) is to be mapped. It has the source attributes 310 (SD1.FirstName) and 320 (SD1.LastName). Because the transformation graph is empty at this starting point, new nodes 330 and 340 are added and mapped to—one for each source attribute (i.e., SD1.FirstName→First_Name, SD1.LastName→Last_Name). This may be done by mapping all source attributes from a data source (Primitive 1.1), or individually selecting source attributes to add by the user (Primitive 1.2).

Figure 4A:
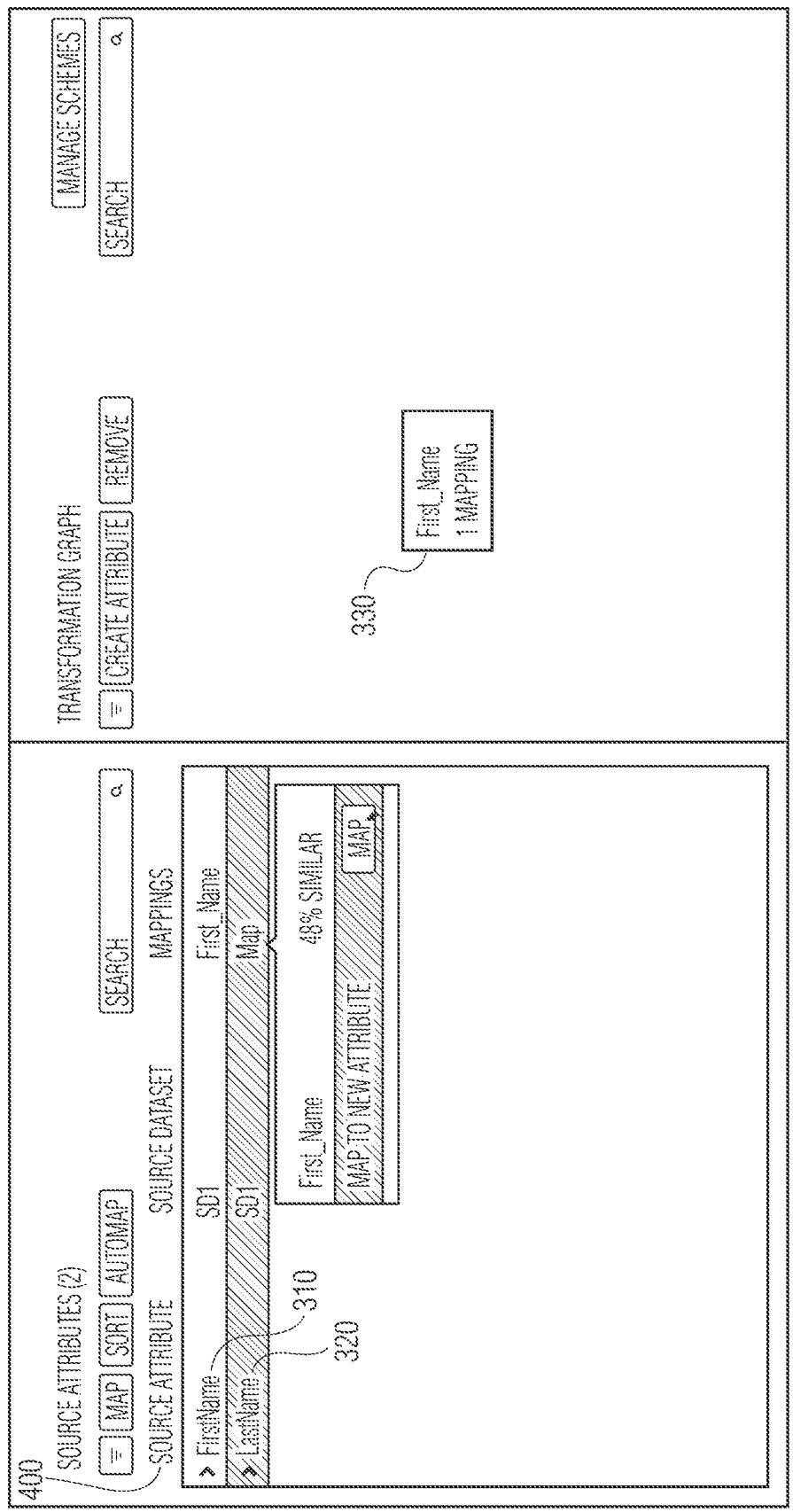
FIGS. 4A, 4B, and 4C illustrate a user interface for creating nodes and mapping source attributes to nodes of a transformation graph.
Figure 4B:
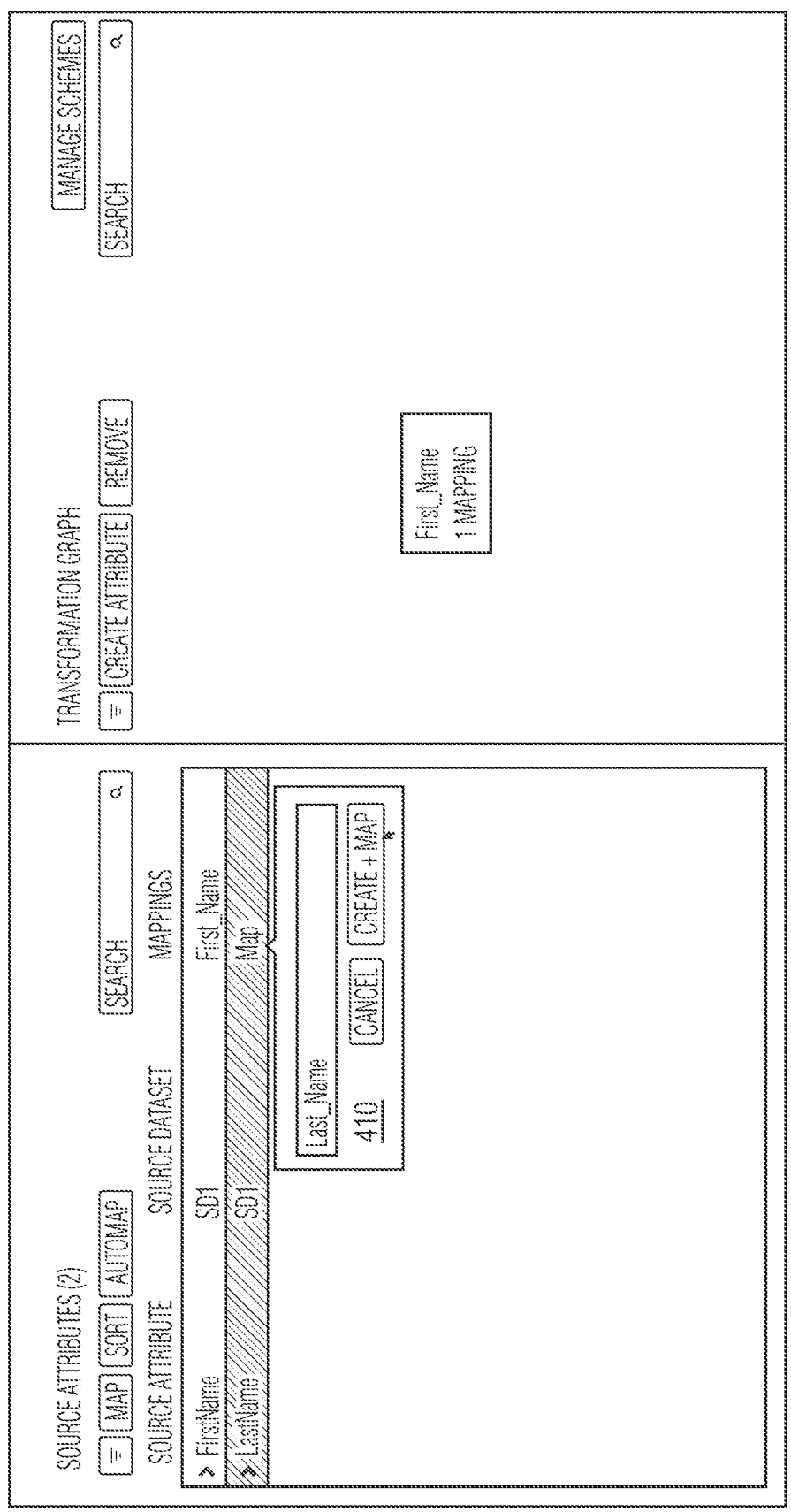
Figure 4C:
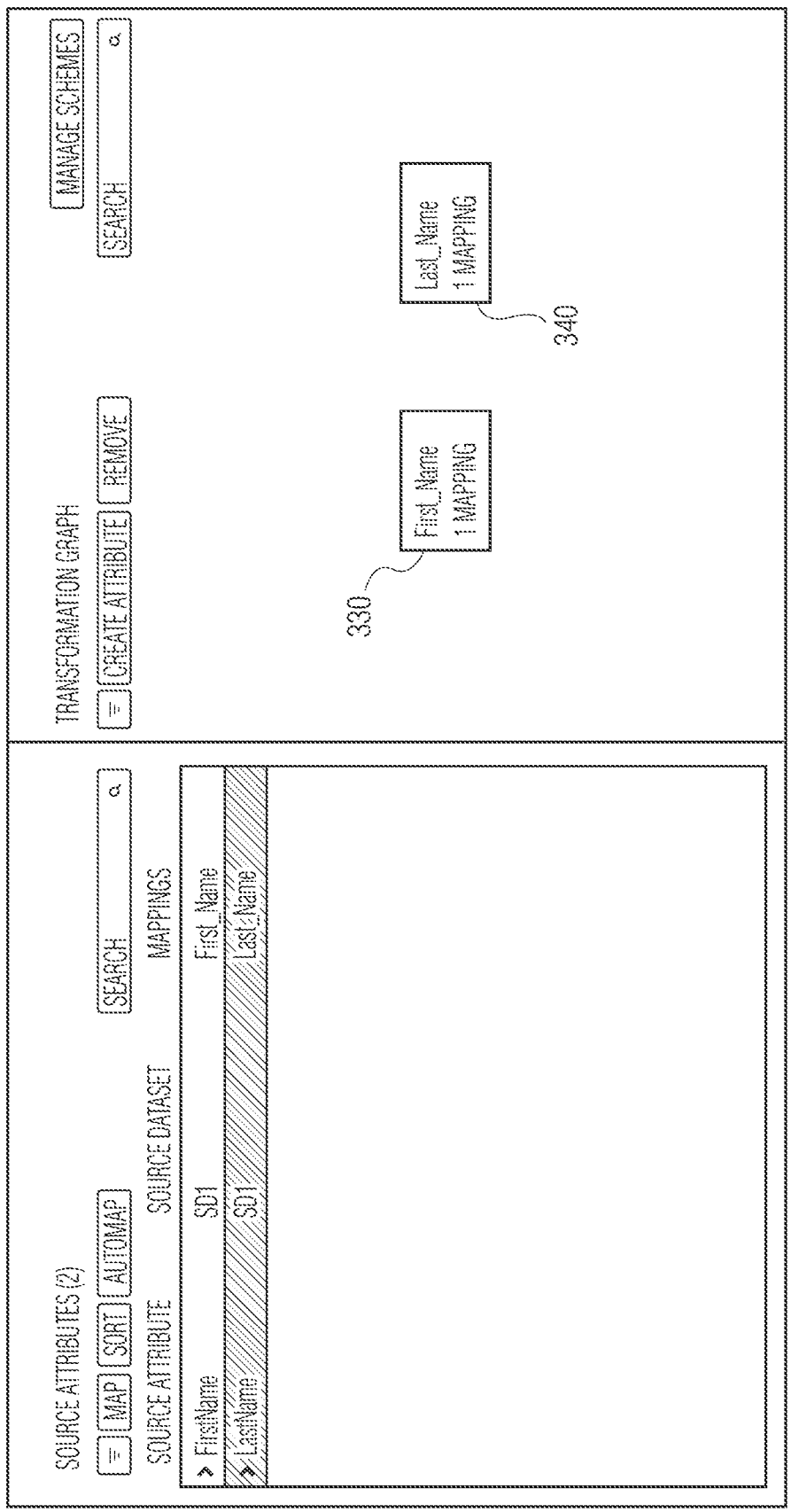

Referring also to FIG. 4a, a GUI can assist users by providing a visual, interactive representation of the transformation graph. For example, the GUI may present data source and source attribute selection on one side, and a transformation graph on another. Alternatively, these may be separate GUI windows, tabs, or user arrangeable divisions. Source dataset 300 is loaded into the system, and available source attributes 400 are displayed to the user. Default operation may display all source attributes within a dataset, alternative operation may allow user selection of desired source attributes when selecting the source dataset. As shown, node 330 has been created for First_Name, and the user is in the process of creating node 340. The system has calculated a similarity score between First_Name and the data (LastName) in source attribute 320, and suggested matching to node 330 (with a 48% similarity). Instead, the user is about to select "Map to a new attribute" to create node 340. Within this sample user interface, "attribute" may refer to any node within the transformation graph. Referring also to FIG. 4b, "Map to a new attribute" triggers a dialog 410 allowing user input of a name for the new node being created. Referring also to FIG. 4c, after creation of the second node the transformation graph displays both nodes 330 and 340. Each node in the transformation graph also displays how many source attributes are mapped to that specific node, which is one each in the present example.

Step 2

Figure 5:
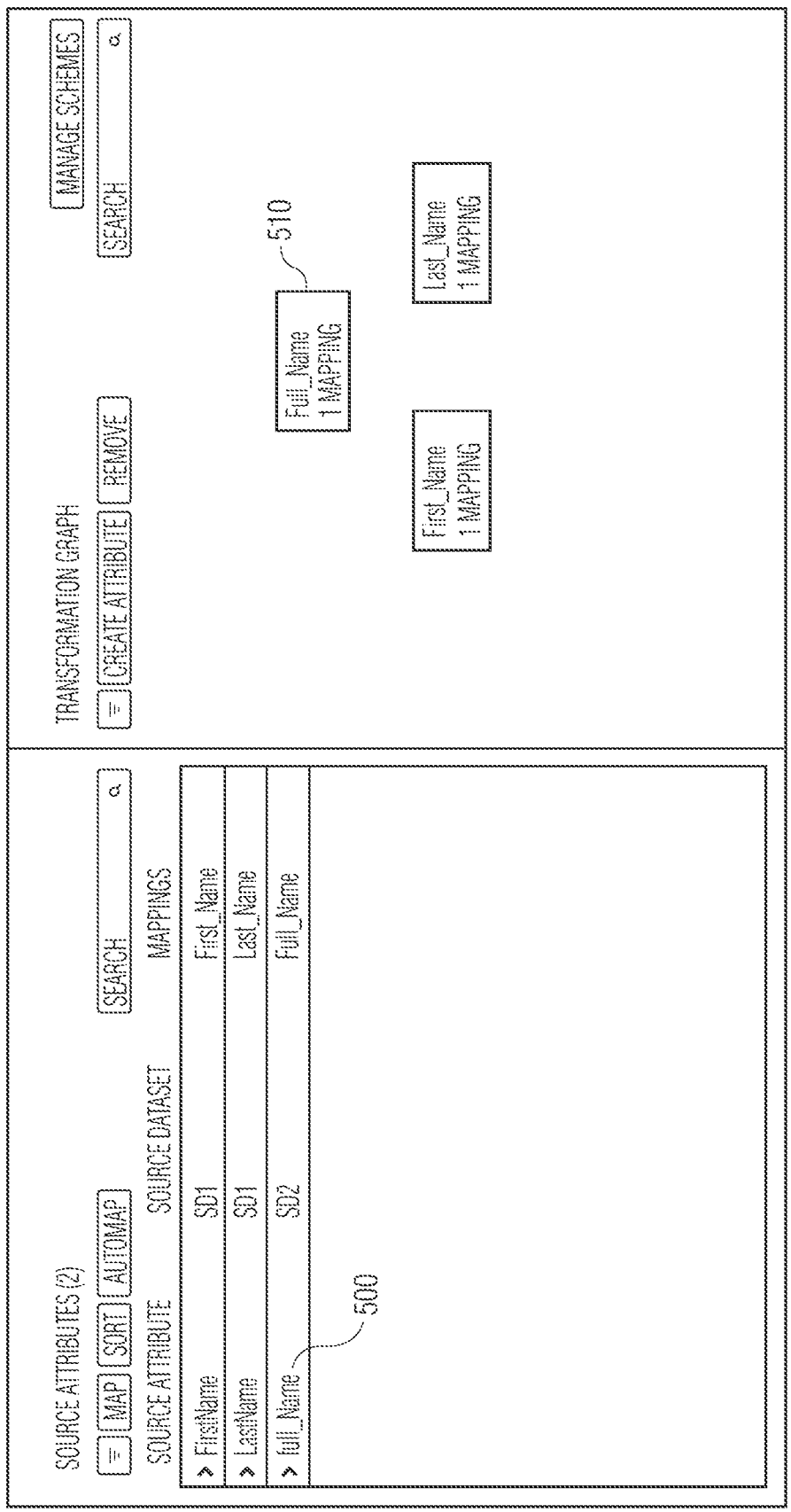
FIG. 5 illustrates the user interface of FIG. 4 with an additional node created.

When another data source is mapped, new nodes may created or source attributes may be mapped to existing nodes in the transformation graph. Referring also to FIG. 5, another source dataset (SD2) is loaded into the system, and a full_Name source attribute 500 has been mapped to newly created Full_Name node 510 in the transformation graph (Primitive 1.2). This example single source attribute SD2.full_Name has similarities between existing nodes, but is not mapped by default to match the existing First_Name or Last_Name nodes. The user may now create edges between the Full_Name node and the First_Name and Last_Name nodes to transform data between the nodes.

Figure 6:
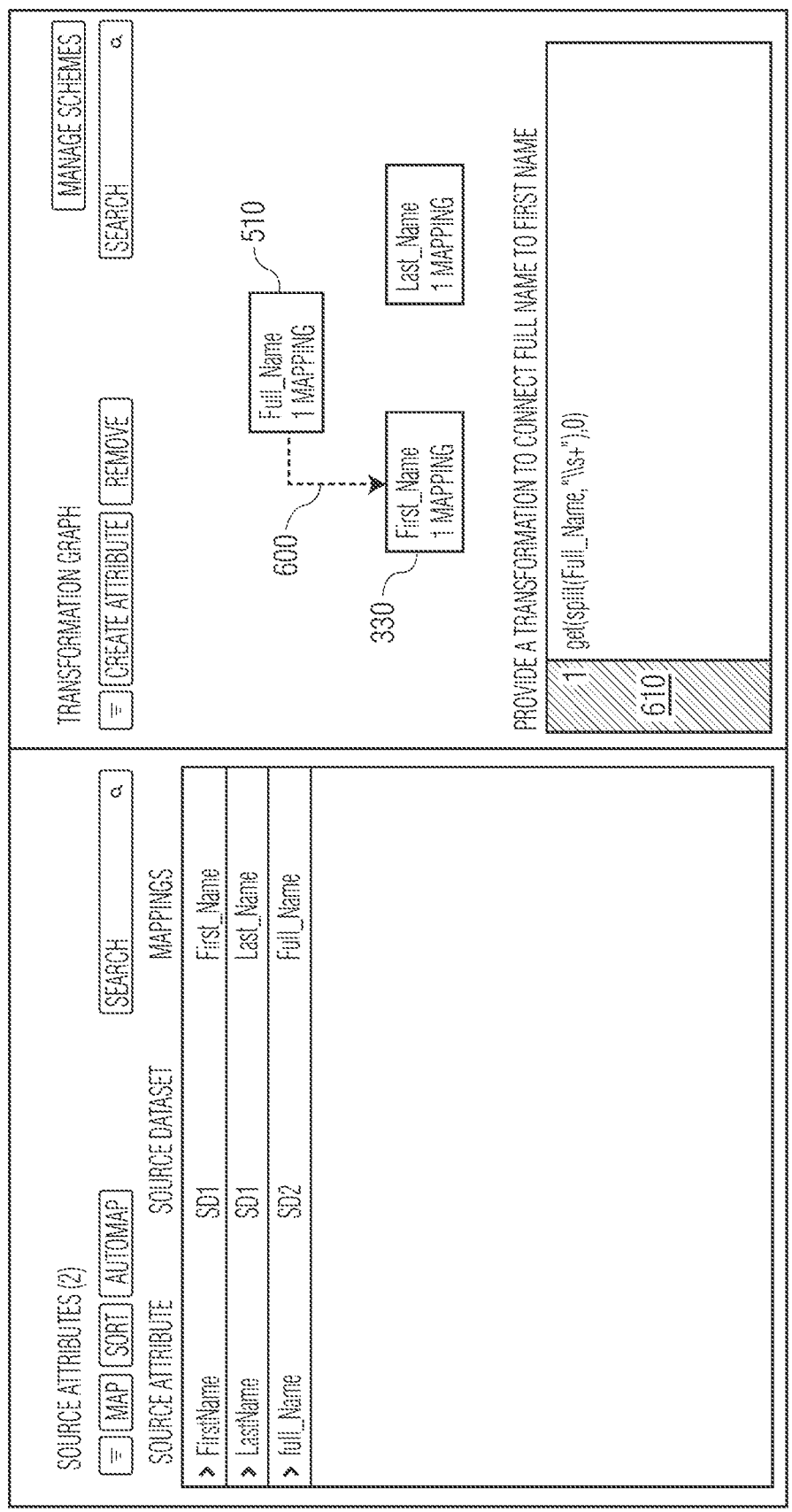
FIG. 6 illustrates the adding a transformation between nodes within the user interface of FIG. 5.

Referring also to FIG. 6, edge creation may involve selecting two nodes, such as clicking on one node and dragging to the other. If no paths exist between the nodes, such as none between nodes 510 and 330, the system may create edge 600 connecting the nodes and present transformation selection tool 610 for the user to define any transformation. Transformation selection tool 610 may present a library for selection, such as visualizations of transformations, or a coding window to type in transformation commands. Any standard language may be implemented, focused on string and numeric operators; SQL or Python-like scripting environments are two examples of representative languages. In the example shown, the user may use a "split" operation on the Full_Name node, transforming any data before a first space into the First_Name node. A similar edge and operation may be configured for Last_Name, such as transforming all text after a last space from Full_Name into Last_Name.

Figure 7:
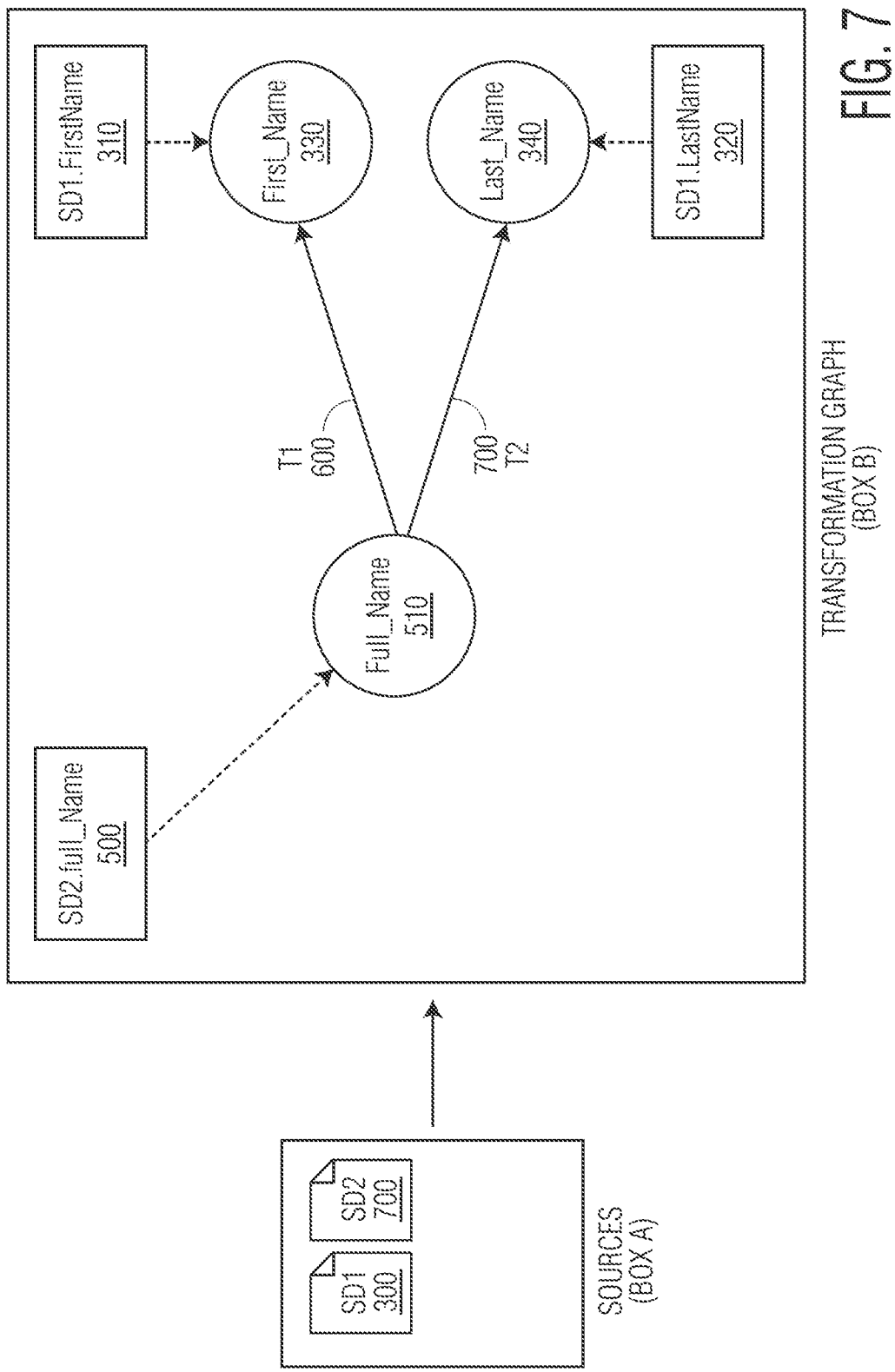
FIG. 7 illustrates adding mappings and transformations of a second data source to the transformation graph of FIG. 3.

Referring also to FIG. 7, after these edges 600 and 700 are crated, First_Name 330 and Last_Name 340 have two datasets, 300 and 700, contributing records. At this point, the user can already export a few different versions of a target schema. Any nodes in the transformation graph may be selected as targets nodes for a schema, so the target schema could include Full_Name and First_Name, Full Name and Last_Name, all three, or any other combination.

Step 3

Figure 8:
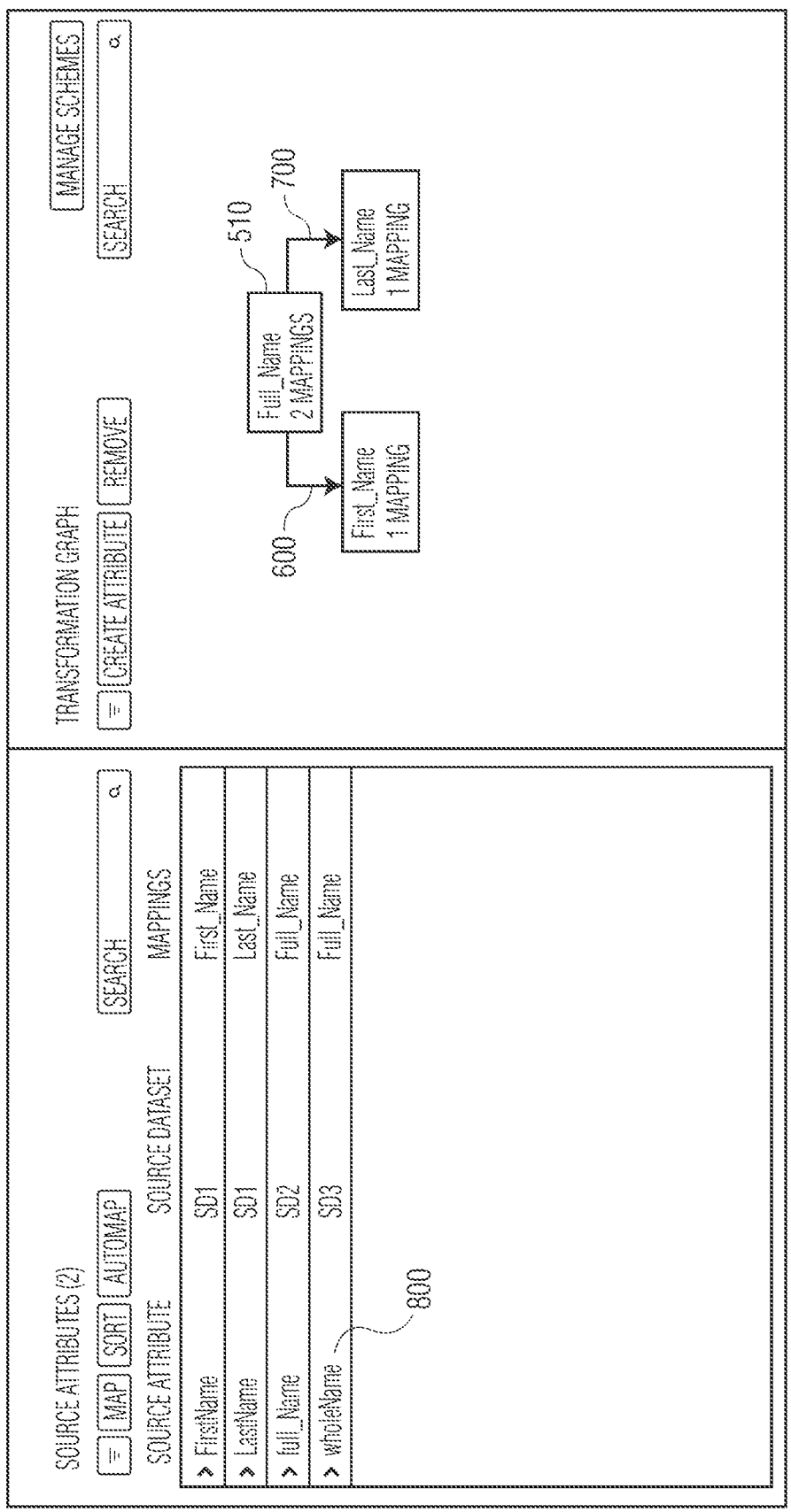
FIG. 8 illustrates adding new source attributes from a second data source within the user interface of FIG. 6.
Figure 9:
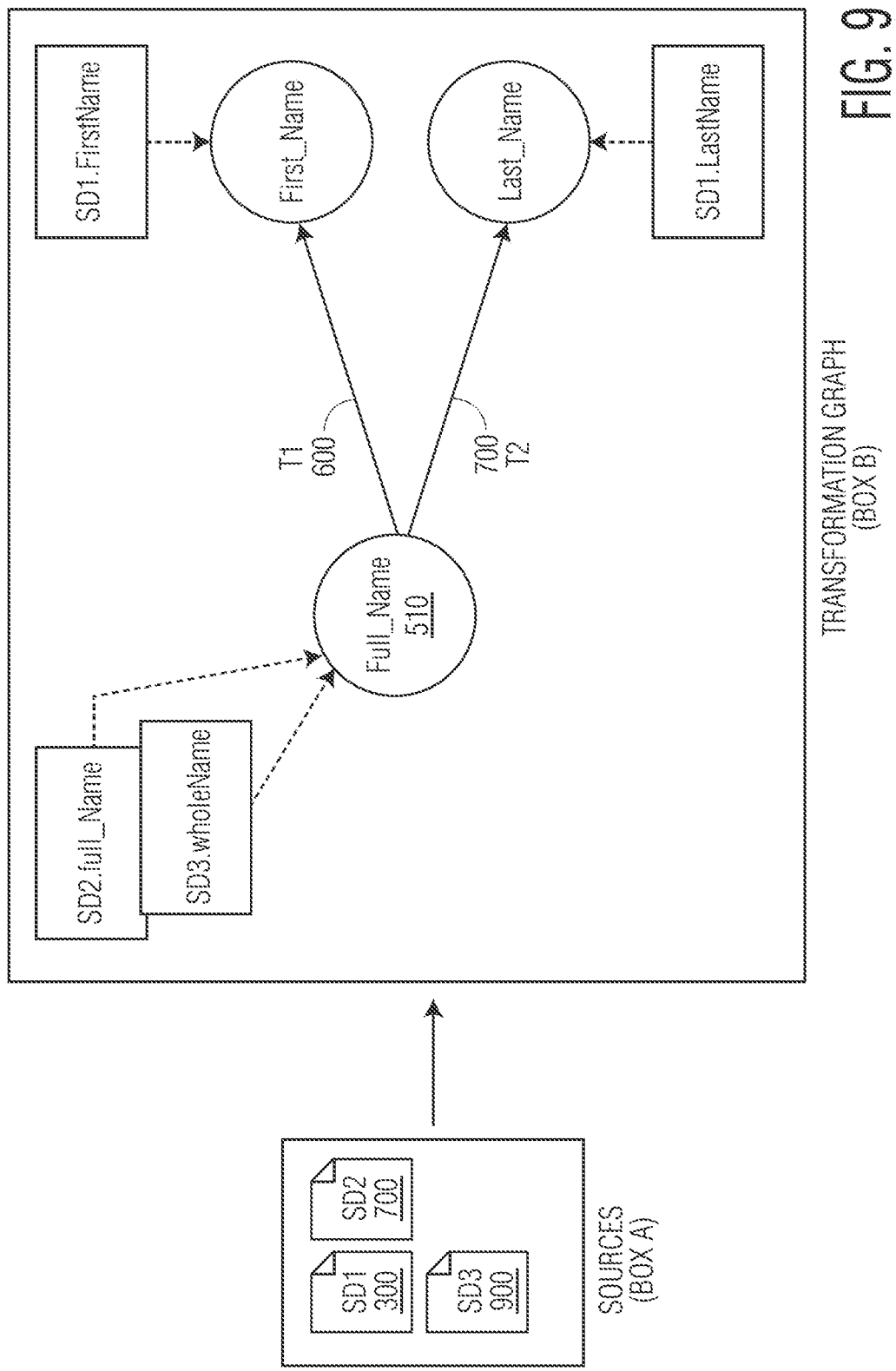
FIG. 9 illustrates adding mappings and transformations of a third data source to the transformation graph of FIG. 7.

Referring also to FIG. 8, additional data sources and source attributes may be incorporated. In the example shown, a third source dataset (SD3) is added containing source attribute 800 SD3.wholeName. Between overlap of metadata and content structure, the system may recognize this as an exact match for the Full_Name node. With an exact match, the system automatically maps the new source attribute to the matched node (Primitive 1.1). This is reflected in the transformation graph within the user interface, which now indicates that node 510 has two source attribute mappings. Referring also to FIG. 9, since the edges 600 and 700 from Full_Name to First_Name and Last_Name have already been defined, the transformations defined in each edge also will be performed on SD3.wholeName. Data in SD3.wholeName follows the path already defined for Full_Name node 510—this enables intelligent data propagation without the user having to specify anything at all.

First Name and Last Name now have three sources, 300, 700, and 900, contributing records. Furthermore, transformation paths can be scoped or filtered such that they only apply to specific source datasets. The user could configure rules, through the transformation interface, for edges T1 600 and T2 700 to only apply to SD3 900, and not SD2, in which case SD2.full_Name would not automatically flow through this path to First_Name and Last_Name. This provides the user the flexibility to control whether all datasets mapped to a node flow through the transformation paths, or to limit the edges to only certain sources.

Step 4

Figure 10:
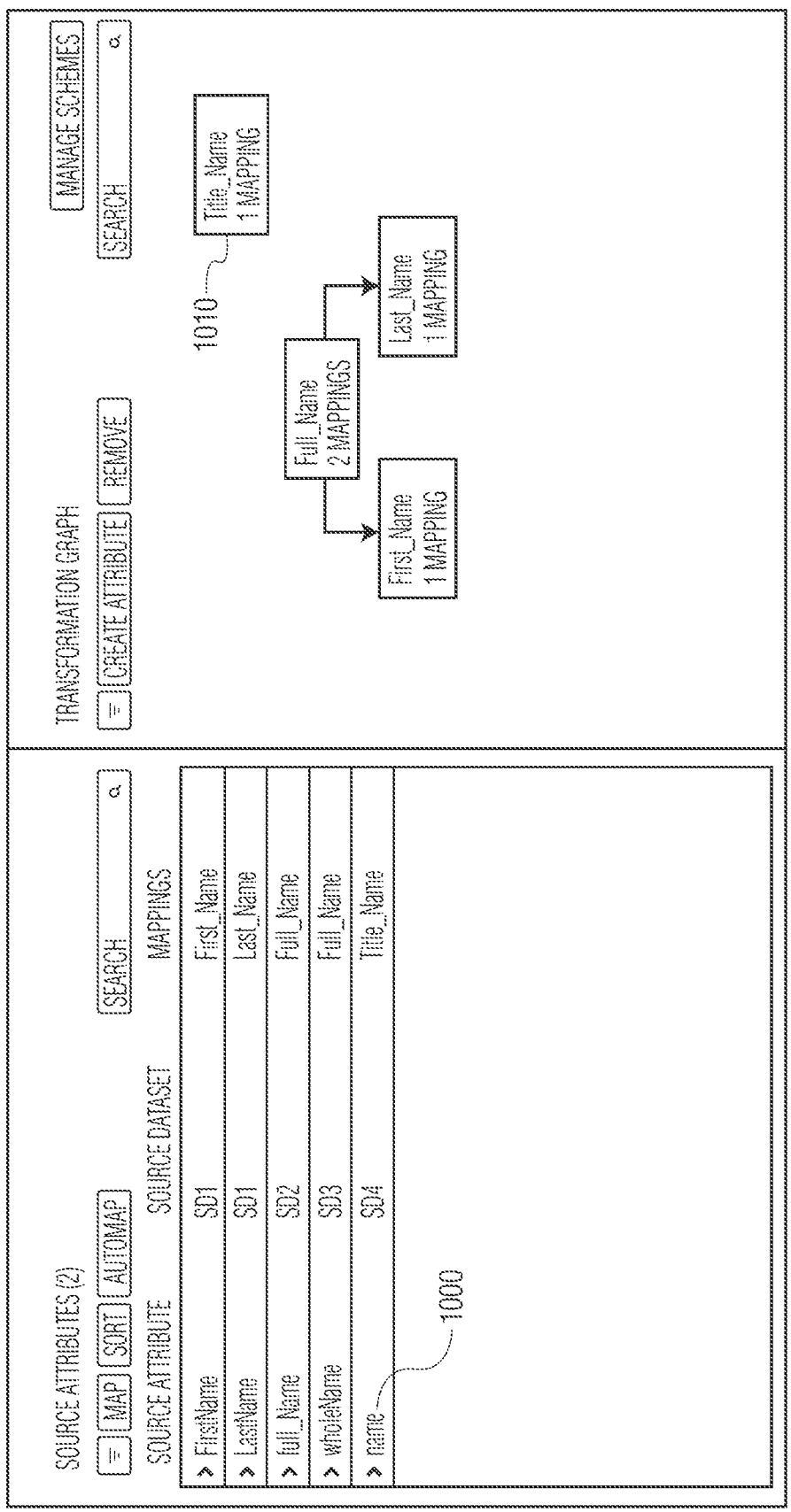
FIG. 10 illustrates mapping source attributes from a third data source to a new node within the user interface of FIG. 8.

Referring also to FIG. 10, a fourth data source (SD4) is added containing source attribute 1000 SD4.name. While this could match Full_Name, for the purpose of this example SD4.name contains a variation not perviously encountered—a title and a first and last name (e.g., Dr. John Smith). As this results in no exact match in the transformation graph, new node 1010 Title_Name is created and mapped into (Primitive 1.2).

Figure 11:
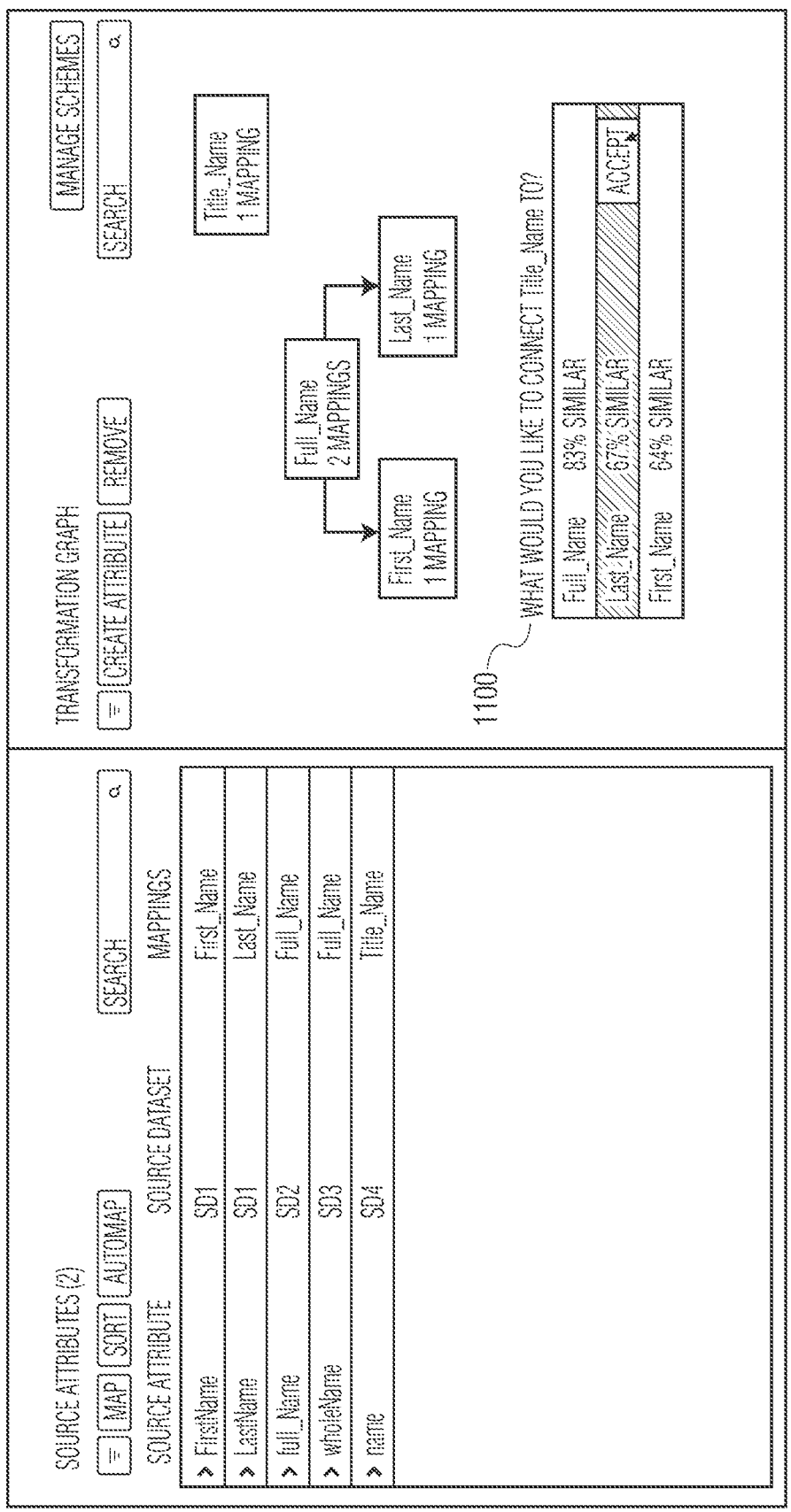
FIG. 11 illustrates adding transformations from the new node within the user interface of FIG. 10

Referring also to FIG. 11, as part of Primitive 1.3 the system may detect similarities with other existing nodes, but no exact match. In such a case, the system may present selection interface tool 1100, displaying the similar nodes and calculated similarity scores for user selection. The user may choose to make no selection, and manually insert connecting edge. Alternatively, the user may select one of the suggested nodes.

Figure 12:
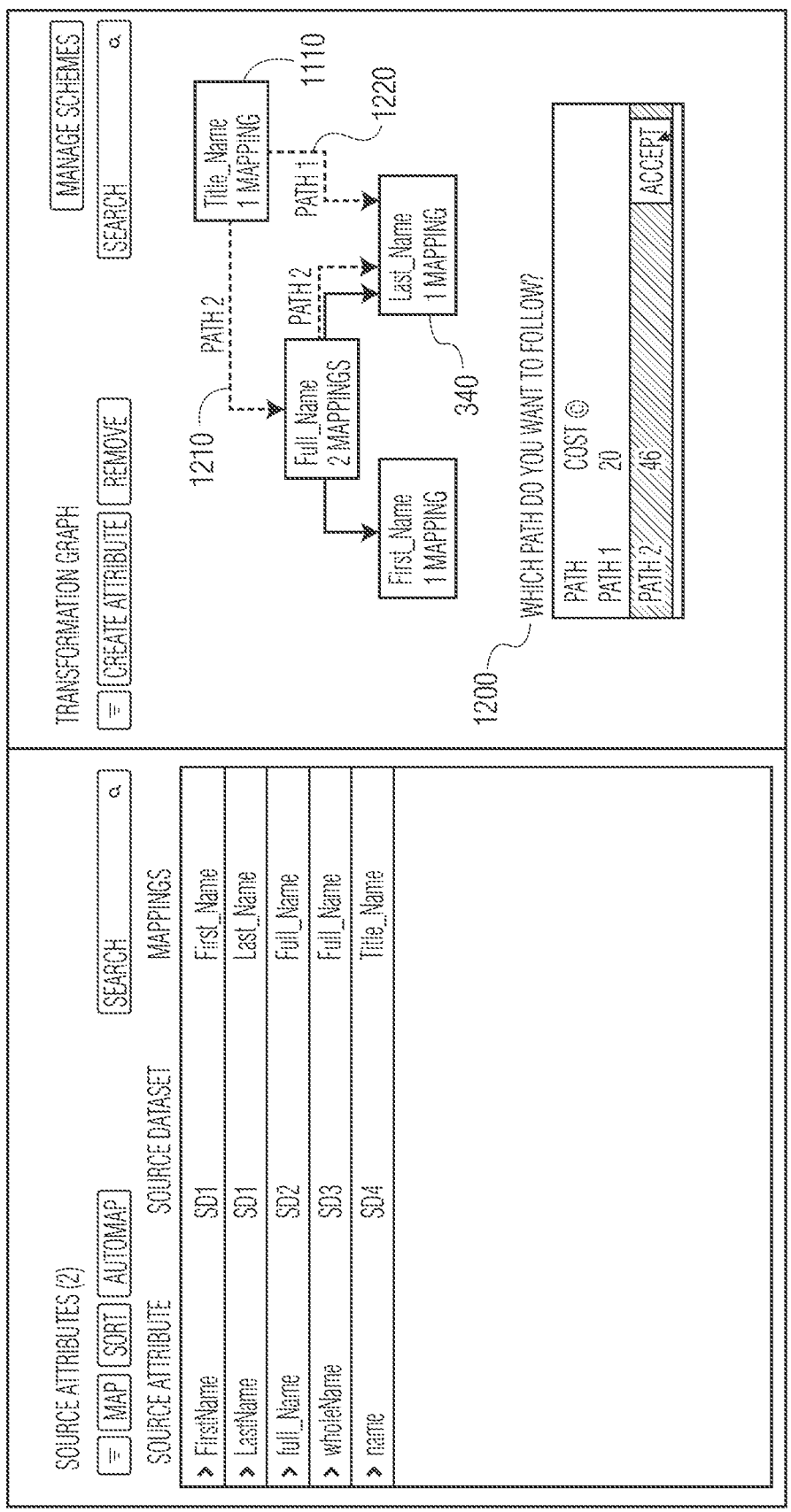
FIG. 12 illustrates cost evaluation and selection between multiple paths for a transformation within the user interface of FIG. 11.

Referring also to FIG. 12, upon selection of a similar node, the system calculates possible paths from the new node to the selected similar node. For each path, the system calculates a cost. While alternate cost calculations may be used, the preferred cost calculation factors processing time and memory usage. Data for processing time and memory usage may be tracked from prior transformations performed along the edge between nodes. For any new edge required, a default and fixed cost factor may be applied. Alternatively, an estimated cost for new edges may be calculated based on degree of similarity between the new node and the node to which a created edge would connect and estimated complexity of transformation between the two nodes. With costs determined, interface tool 1200 presents the various path options, ordered sequentially by total path cost (sum of all edge costs in the path). In the illustrated example, the user chose to connect node 1010 (Title_Name) to node 340 (Last_Name). The system calculated two paths, path 1210 (from Title_Name through Full_Name to Last_Name) and path 1220 (direct from Title_Name to Last_Name), and displayed calculated cost for each path. Upon user selection of a path, the system creates any required new edge and may again present interface tool 610 for user definition of any initial transformation required from the newly created node.

Figure 13:
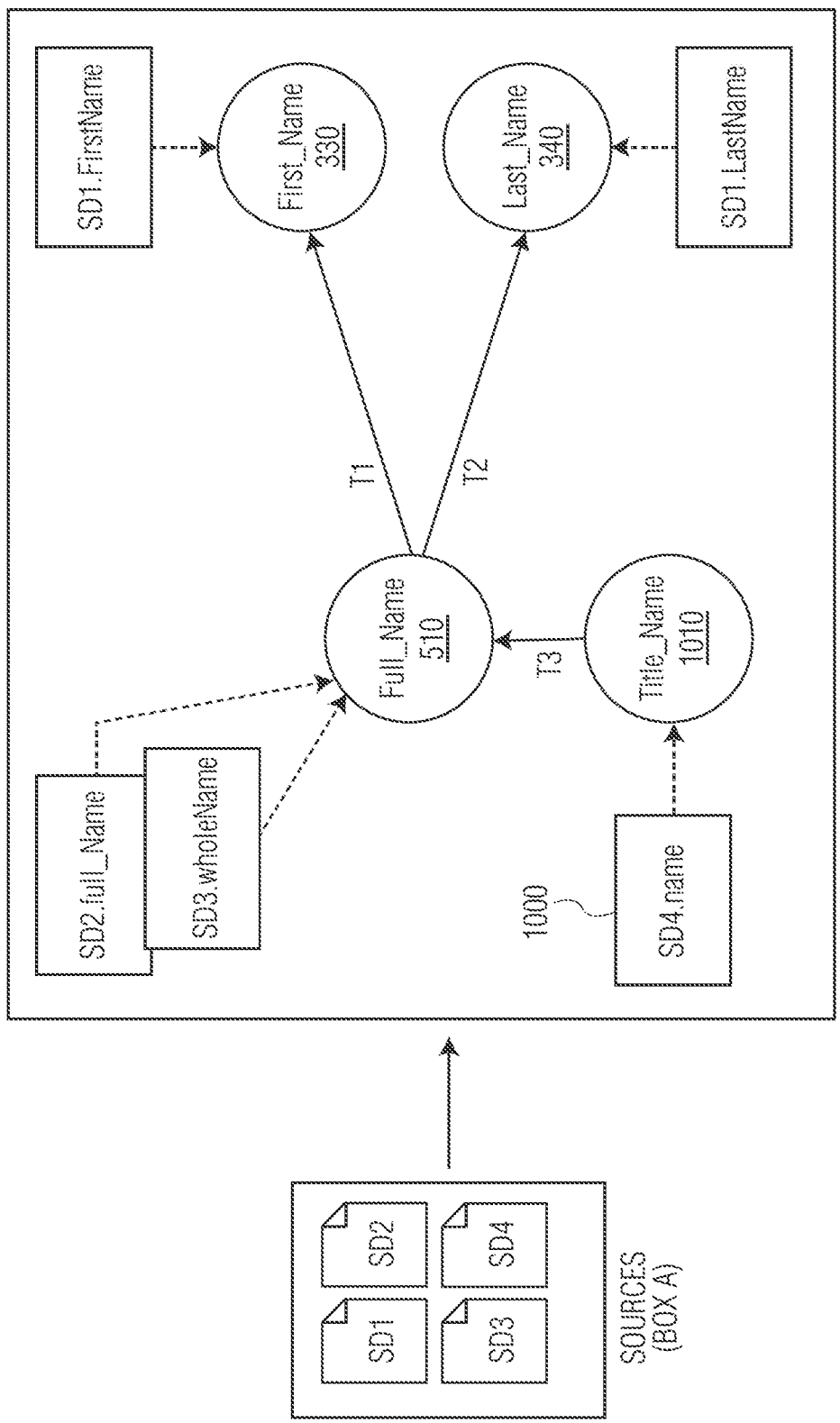
FIG. 13 illustrates adding mappings and transformations of a fourth data source to the transformation graph of FIG. 9

In the example case, although path 1210 has higher cost, it would ensure that each node in the transformation graph contains as many records as possible. Referring also to FIG. 13, by connecting node 1010 (Title_Name) to node 510 (Full_Name), Full_Name, node 340 (Last_Name), and node 330 (First_Name, through the other previously edge leading out of Full_Name)) will have values originating from source attribute 1000 (SD4.name) propagated to them.

Step 5

Figure 14:
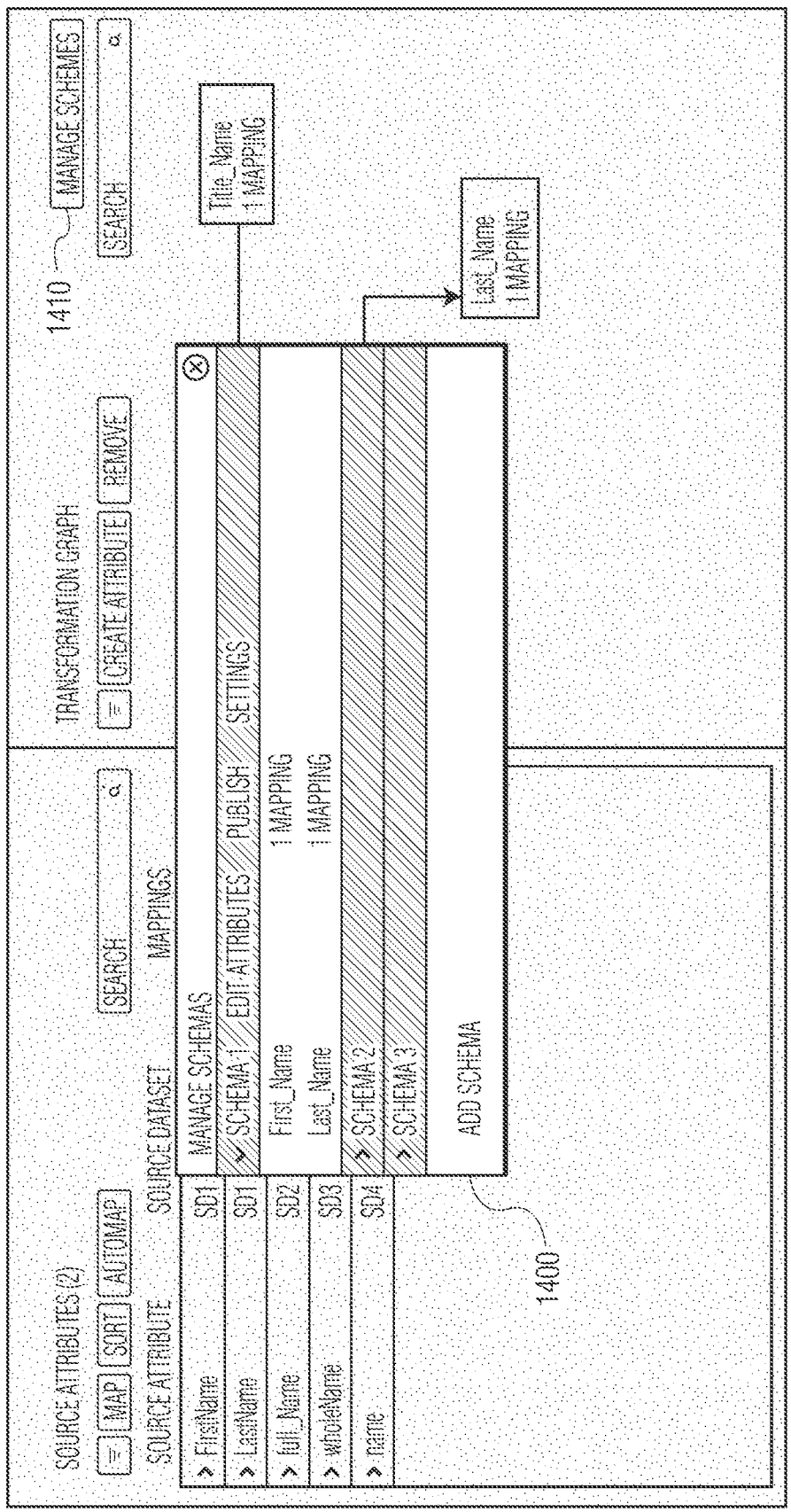
FIG. 14 illustrates target schema management and export within the user interface of FIG. 12.
Figure 15:
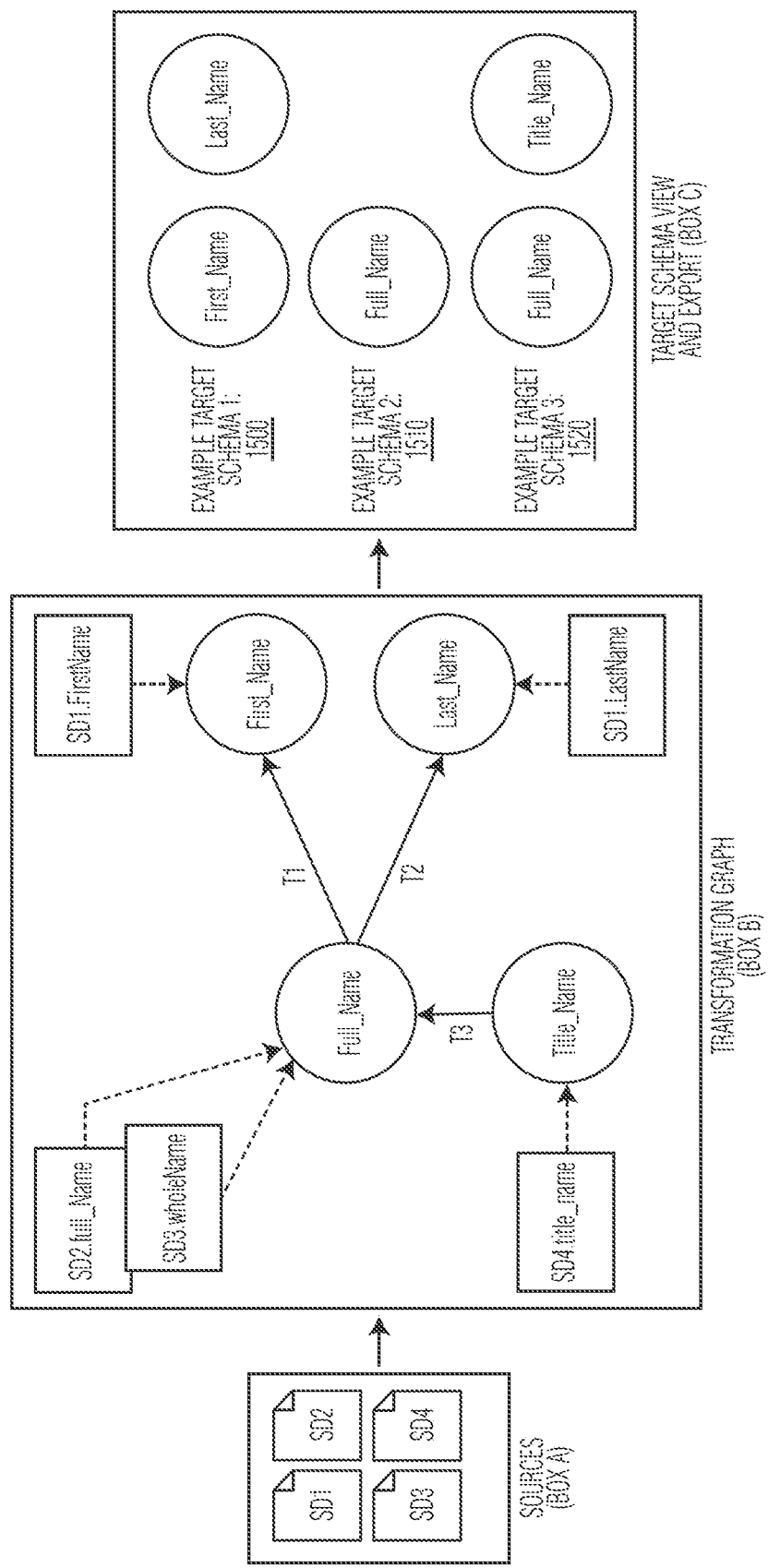
FIG. 15 illustrates example target schemas created within the transformation graph of FIG. 13.

With data sources mapped to the transformation graph, the user may want to export a target schema. Referring also to FIG. 14, target schema interface 1400 may be presented, such as in response to user selection of "Manage Schemas" button 1410. Any number of target schemas may be created, such as by selecting "Add schema." Within a schema, any number of nodes may be selected, such by selecting "Edit Attributes", for inclusion in that target schema. Any specific target schema can be exported, such as by selecting "Publish." Exporting a schema may lead to user interface options for selecting an export target, such as to a separate file or exported to a destination database or server. The exported schema can then be referenced to query the system, such as through a sequential query language (SQL). Queries to the system using the target schema access the data as transformed into the nodes of the target schema. Referring also to FIG. 15, allowing multiple target schemas enables one or multiple users to create multiple target views from same data sources, such as example target schemas 1500, 1510, and 1520.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for computer assisted mapping of source attributes of an unmapped data source into an existing transformation graph, comprising:
    operating a computer system having at least one central processing unit and storing a transformation graph that maps source attributes from at least one data source to nodes within the transformation graph, wherein the transformation graph is an evolving graph of nodes, and the transformation graph includes edges which represent transformations between the nodes, and wherein the transformation graph allows for building reusable transformation paths;
    accessing a second data source, wherein the second data source is distinct from the at least one data source;
    selecting one or more source attributes from the second data source;
    for each selected source attribute, checking for an exact match between the selected source attribute and existing nodes within the transformation graph;
    when an exact match is found, automatically mapping the matched source attribute to the matched node, and when an exact match is not found, creating a new node in the transformation graph and mapping the unmatched source attribute to the new node;
    identifying existing nodes in the transformation graph that are similar to the new node;
    selecting one of the identified similar nodes;
    calculating a cost for each path from the new node to the selected node;
    presenting, for user selection, all paths in order of calculated cost;
    receiving user selection of one of the presented paths; and
    creating a new edge from the new node to a first existing node sequentially in the selected path,
    the source attributes of the second data source thereby being mapped to the transformation graph.

2. The method of claim 1, wherein creating a new edge further comprises:
    displaying a user interface control to configure transformation rules between two nodes directly connected by the new edge; and
    defining, by a user through the user interface control, transformation rules between the two nodes directly connected by the new edge.

3. The method of claim 2, wherein the user interface control presents visualizations of transformation actions for user selection.

4. The method of claim 2, wherein the user interface control presents a text box for user input of programming language commands to execute a transformation.

5. The method of claim 1 further comprising:
    tracking one or more selected nodes in a target schema; and
    exporting the target schema to a file, database, or server.

6. The method of claim 5, further comprising:
    upon receiving a query based on the target schema, applying mappings and transformation paths defined in the transformation graph to data from the source attributes to provide data as defined at the selected nodes of the target schema.

7. The method of claim 1, wherein identifying existing similar nodes further comprises:
    comparing data and metadata of the unmatched source attribute to data and metadata associated with each existing node in the transformation map.

8. The method of claim 7, further comprising:
    clustering semantically related nodes;
    identifying which clusters are most similar to the new node; and
    pruning to reduce a search scope when identifying similar existing nodes.

9. The method of claim 1, further comprising:
    storing metadata associated with source attributes at nodes that the source attributes map into; and
    comparing the stored metadata with metadata of new source attributes when checking for exact matches.

10. The method of claim 1, wherein calculating a cost further comprises:
    determining processing time and memory usage for existing edges;
    creating an edge cost based on the determined processing time and memory usage; and
    summing the created edge costs for all existing edges for each path.

11. A computer system for assisted mapping of source attributes of an unmapped data source into an existing transformation graph, comprising a central processing unit operating software stored on non-transitory computer media and a data storage source storing a transformation graph that maps source attributes from at least one data source to nodes within the transformation graph, wherein the transformation graph is an evolving graph of nodes, and the transformation graph includes edges which represent transformations between the nodes, and wherein the transformation graph allows for building reusable transformation paths, the software comprising instructions to:
    access a second data source, wherein the second data source is distinct from the at least one data source;
    select one or more source attributes from the second data source;
    for each selected source attribute, check for an exact match between the selected source attribute and existing nodes within the transformation graph;
    when an exact match is found, automatically map the matched source attribute to the matched node, and when no exact match is found, create a new node in the transformation graph and map the unmatched source attribute to the new node;
    identify existing nodes in the transformation graph that are similar to the new node;
    select one of the identified similar nodes;
    calculate a cost for each path from the new node to the selected node;
    present, for user selection, all paths in order of calculated cost;
    receive user selection of one of the presented paths; and
    create a new edge from the new node to a first existing node sequentially in the selected path,
    the source attributes of the second data source thereby being mapped to the transformation graph.

12. The system of claim 11, wherein instructions to create a new edge further comprise instructions to:
- display a user interface control to configure transformation rules between two nodes directly connected by the new edge; and
- define, by a user through the user interface control, transformation rules between the two nodes directly connected by the new edge.

13. The system of claim 12, wherein the user interface control presents visualizations of transformation actions for user selection.

14. The system of claim 12, wherein the user interface control presents a text box for user input of programming language commands to execute a transformation.

15. The system according to claim 11, wherein the software further comprises instructions to:
- track one or more selected nodes in a target schema; and
- export the target schema to a file, database, or server.

16. The system of claim 15, wherein the software further comprises instructions to:
- receive a query based on the target schema, apply mappings and transformation paths defined in the transformation graph to data from the source attributes, and provide data as defined at the selected nodes of the target schema.

17. The system of claim 11, wherein instructions to identify existing similar nodes further comprise instructions to:
- compare data and metadata of the unmatched source attribute to data and metadata associated with each existing node in the transformation map.

18. The system of claim 17, wherein the software further comprises instructions to:
- cluster semantically related nodes;
- identify which clusters are most similar to the new node; and
- prune to reduce a search scope when identifying similar existing nodes.

19. The system of claim 11, wherein the software further comprises instructions to:
- store metadata associated with source attributes at nodes that the source attributes map into; and
- compare the stored metadata with metadata of new source attributes when checking for exact matches.

20. The system of claim 11, wherein instructions to calculate a cost further comprise instructions to:
- determine processing time and memory usage for existing edges;
- create an edge cost based on the determined processing time and memory usage; and
- sum the created edge costs for all existing edges for each path.

* * * * *